C. E. WHITEMAN & J. R. W. GREGG.
METALLIC PISTON PACKING.
APPLICATION FILED DEC. 3, 1914.
1,205,941. Patented Nov. 21, 1916.
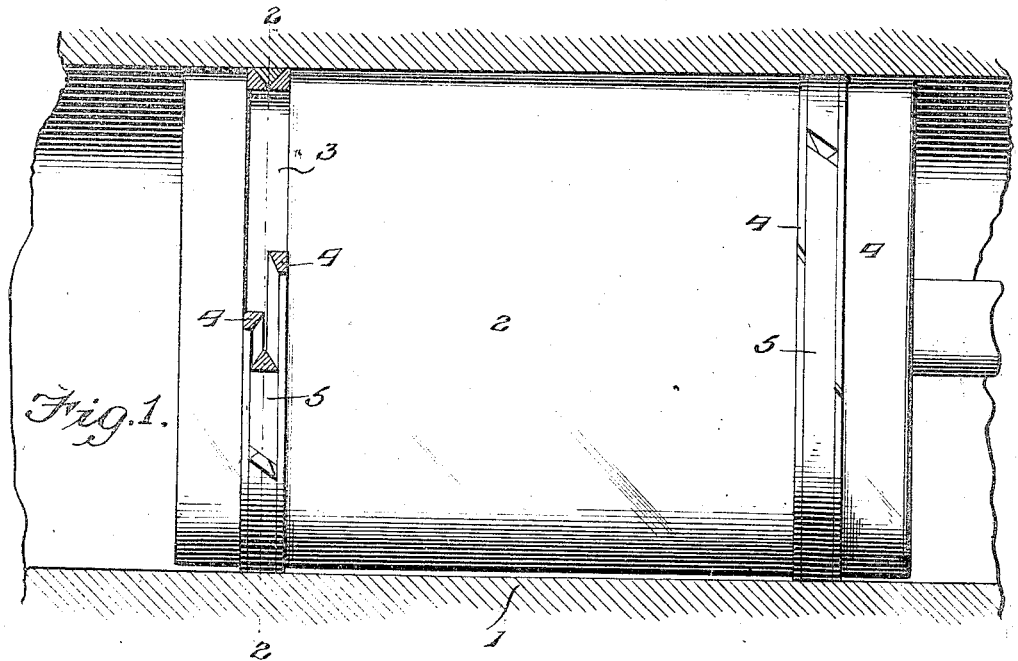
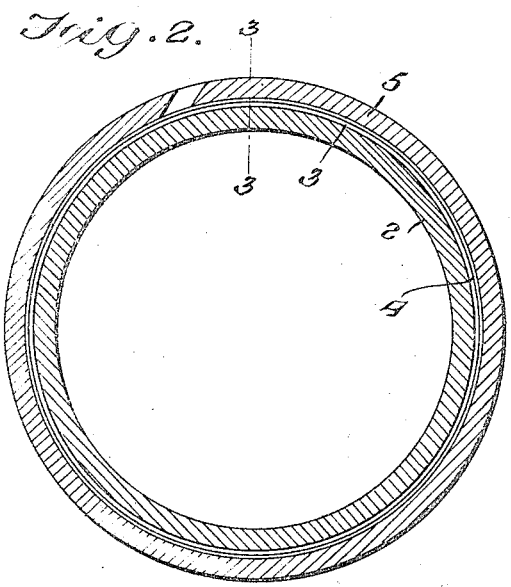
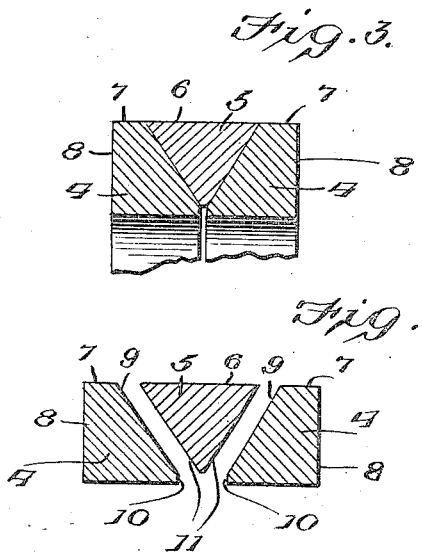
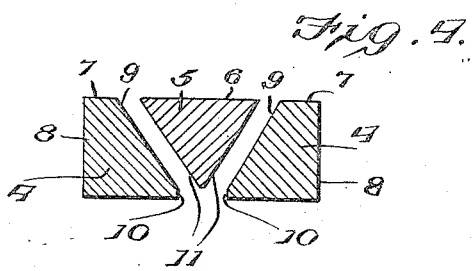
Witnesses
U. B. Hillyard.
W. N. Woodson.
Inventors
C. E. Whiteman
J. R. W. Gregg.
By
A. H. A. Lacey, Attorneys.

UNITED STATES PATENT OFFICE.

CLARENCE E. WHITEMAN AND JAMES R. W. GREGG, OF MEDFORD, OREGON.

METALLIC PISTON-PACKING.

1,205,941.  Specification of Letters Patent.  Patented Nov. 21, 1916.

Application filed December 3, 1914. Serial No. 875,376.

*To all whom it may concern:*

Be it known that we, CLARENCE E. WHITEMAN and JAMES R. W. GREGG, citizens of the United States, residing at Medford, in the county of Jackson and State of Oregon, have invented certain new and useful Improvements in Metallic Piston-Packing, of which the following is a specification.

Internal combustion engines, of the type embodying a cylinder and a piston arranged to operate in the cylinder, almost universally employ a metallic packing to maintain a close joint between the cylinder and piston, said packing being fitted in an annular groove or grooves formed in the outer wall of the piston and consisting of a metallic elastically-expansible ring.

Unless the packing fits the side walls of the groove or seat closely loss of power results, carbon and oil accumulate in the groove and interfere with the action of the power or movement of the piston or noise is experienced by reason of the pounding of the packing against the walls of the groove at each stroke of the piston.

The present invention aims to provide a packing which is self-expansible circumferentially and laterally so as to closely fit the wall of the cylinder and the side walls of the groove of the piston in which the packing is fitted.

The invention consists of a packing embodying a plurality of elastically-expansible metallic rings having their meeting or adjacent faces oppositely inclined whereby relative diametrical movement results in lateral expansion of the packing so as to hold the outer sides of the packing in close contact with the walls of the groove in which the packing is fitted, the members or rings comprising the packing as a whole being of such relative construction and arrangement as to insure the outer faces of the rings or packing members remaining in contact with the wall of the cylinder and maintaining a close joint therewith to prevent loss of power or compression.

For a full understanding of the invention and the merits thereof, reference should be had to the drawings hereto attached, in which:

Figure 1 is a side view of a piston provided with packing embodying the invention, a portion of the packing being broken away and the section lines showing a portion of the cylinder in which the piston is arranged; Fig. 2 is a section on the line 2—2 of Fig. 1; Fig. 3 is an enlarged cross section of the packing; Fig. 4 is a view similar to Fig. 3, the rings or members of the packing being separated.

Corresponding and like parts are referred to in the following description and indicated in all the views of the accompanying drawing by the same reference characters.

The numeral 1 designates a cylinder and 2 a piston arranged to operate therein, such parts being of well known construction and illustrated to demonstrate the application of the invention. The piston 2 is provided with an annular groove 3 forming a seat in which is fitted the packing.

The packing comprises a plurality of metallic elastically-expansible packing rings, each of such rings being of uniform thickness and cross sectional outline throughout its circumferential length. The packing embodies three members or rings, the outer rings 4 being similar and the middle ring 5 being of V-shape in cross section. The outer face 6 of the ring 5 is of greater width than the outer faces 7 of the rings 4, this being essential to admit of the rings 4 wearing away more rapidly than the ring 5 so that the rings 4 may expand and be forced laterally so as to hold their outer sides 8 in close contact with the side walls of the annular groove or seat 3 and thereby prevent any play of the packing in the groove 3 in the direction of the movement of the piston. The inner side of each ring 4 is formed with a bevel face 9 and a straight face 10. The bevel faces 9 are similarly inclined and correspond to the inclination of the bevel faces 11 of the ring 5. The middle ring 5 is of a depth corresponding to the depth of the bevel faces 9 of the rings 4. When the component parts of the packing consisting of the rings 4 and 5 are assembled the ring 5 fits snugly in the V-shaped channel or groove formed between the bevel faces 9 of the rings 4 with the outer faces 6 and 7 of the rings in the same plane or coming flush so as to bear against the inner wall of the cylinder 1.

When the packing is in position the straight faces 10 of the rings 4 practically come together, as shown most clearly in Figs. 1 and 3. In practice the outer faces of the rings wear but by reason of the outer faces 7 of the side rings 4 being less than the outer face 6 of the middle ring 5, the faces 7 wear away more rapidly than the face 6, hence the rings 4 expand proportionately more rapidly than the ring 5 and the bevel faces 9 riding upon the bevel faces 11 cause a separation of the rings 4 with the result that their outer sides 8 are held pressed into close engagement with the side walls of the groove 3, thereby preventing any loss of compression or power or any lateral play of the packing in the groove 3.

While the packing is designed chiefly for the pistons of internal combustion engines it is to be understood that it may be applied to plungers or other moving parts requiring self-expansible metallic packing without requiring the use of extraneous means to cause an expansion of the packing to maintain a close joint. It is to be understood that the rings or members comprising the packing are slit or open to admit of expansion, the latter being due to the inherent elasticity of the rings.

When adapting the invention to specific requirements it is to be understood that various changes in the form, construction and minor details may be resorted to without departing from the essential features of the invention as embodied in the claim.

Having thus described the invention, what is claimed as new is:—

A metallic piston packing comprising expansible side rings and an expansible intermediate ring, the side rings having their outer lateral faces located in parallel planes and portions of their inner lateral faces disposed parallel with the outer lateral faces and other portions of their inner lateral faces located in relatively inclined planes diverging in the direction of the outer circumferential surface of the packing, the intermediate ring being triangular in cross section and having its lateral faces intersecting at the junction of the inclined and parallel portions of the inner lateral faces of the side rings, the outer circumferential surface of the intermediate ring being of a width greater than the combined widths of the outer circumferential surfaces of the side rings, the side and intermediate rings having a tendency to expand diametrically.

In testimony whereof we affix our signatures in presence of two witnesses.

CLARENCE E. WHITEMAN. [L. S.]
JAMES R. W. GREGG. [L. S.]

Witnesses:
W. E. CREWS,
B. R. McCABE.